H. Benton,
Knife Rest.
N° 42,339. Patented Apr. 19, 1864.
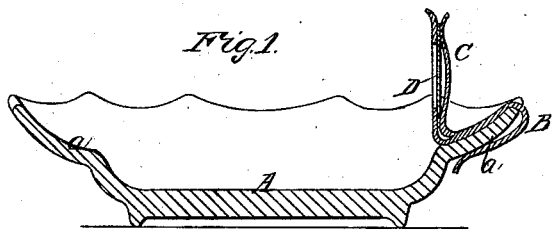
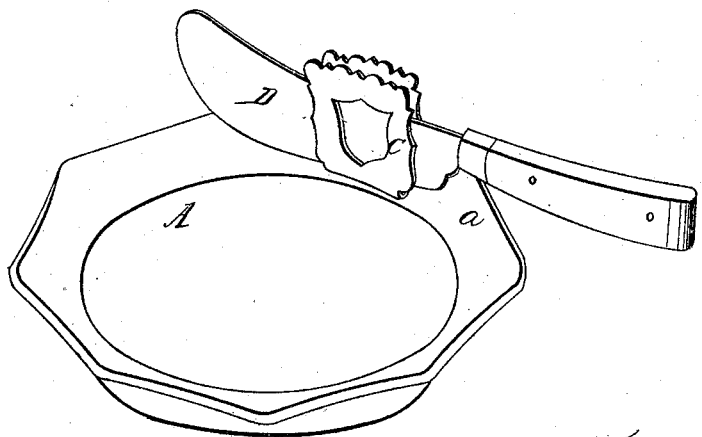

UNITED STATES PATENT OFFICE.

HENRY BENTON, OF GUILFORD, CONNECTICUT.

IMPROVED HOLDER FOR BUTTER-KNIVES.

Specification forming part of Letters Patent No. 42,339, dated April 19, 1864.

*To all whom it may concern:*

Be it known that I, HENRY BENTON, of Guilford, in the county of New Haven and State of Connecticut, have invented a new and Improved Device for Holding Butter-Knives, &c.; and I do hereby declare that the following is a full, clear, and exact description of the same, reference being had to the accompanying drawings, in which—

Figure 1 represents a transverse vertical section of my invention. Fig. 2 is a perspective view of the same.

Similar letters of reference in both views indicate corresponding parts.

The object of this invention is to produce a simple and neat device which can be readily clasped to the edge of a plate or dish, and which is provided with a spring-socket to hold a knife in such a manner that said knife is prevented slipping off the plate or dish and soiling the table-cloth.

To enable those skilled in the art to make and use my invention, I will proceed to describe it.

A represents a plate or dish of any desired description, and made of glass, china, or any suitable material, and provided with a rim or flange, a, to which the clasp B may be secured. This clasp consists of a simple piece of sheet metal, or other suitable material, bent over in the form shown Fig. 1, so that the same, on being slipped over the edge of the plate, takes a firm hold and readily retains itself in the desired position.

It is obvious, however, that the form and construction of this clasp may be changed in hundreds of different ways; and I do not wish to confine myself to the peculiar form and construction shown in the drawings, tub this form, being the simplest and cheapest, will be preferable to all others in most cases. This clasp B is provided with a spring-socket, composed of two jaws, made of thin sheet metal, hammered or rolled sufficiently hard to obtain the desired elasticity, and slightly curved in the manner shown in Fig. 1, so that if said jaws are left to close their top edges remain open to give access to the knife D.

This device is of peculiar advantage for the purpose of holding butter-knives. Such knives are generally placed on the butter or on the edge of the plate, and if a person takes hold of the plate the knife is liable to slip off and to soil the table-cloth. By my invention this difficulty is entirely obviated. The clasp B can be readily attached to the edge of the plate, and the knife, being retained in the socket C, is always on hand, and is not liab'e to fall off and soil the table-cloth. It is obvious, however, that my holder can be used with advantage for the purpose of holding knives of any other description besides butter-knives, and I do not wish to confine myself in its use to this particular class of knives.

What I claim as new, and desire to secure by Letters Patent, is—

The employment or use of the clasp B, with spring-socket C, in combination with a plate, A, or its equivalent, and with a knife, D, substantially in the manner and for the purpose herein shown and described.

HENRY BENTON.

Witnesses:
STEPHEN ROBINSON,
EDWARD R. LANDON.